United States Patent [19]

Howell

[11] 3,962,674
[45] June 8, 1976

[54] ACOUSTIC LOGGING USING ULTRASONIC FREQUENCIES

[75] Inventor: Eddie P. Howell, Plano, Tex.
[73] Assignee: Atlantic Richfield Company, Los Angeles, Calif.
[22] Filed: Feb. 27, 1975
[21] Appl. No.: 553,555

[52] U.S. Cl. .............. 340/15.5 AC; 340/15.5 BH; 181/103; 340/15.5 TN
[51] Int. Cl.² .......................................... G01V 1/40
[58] Field of Search .............. 340/15.5 BH, 15.5 TI, 340/15.5 AC; 181/102, 103; 250/254; 175/40, 41, 50; 324/2

[56] References Cited
UNITED STATES PATENTS

| | | | |
|---|---|---|---|
| 3,102,251 | 8/1963 | Blizard | 340/15.5 AC |
| 3,130,808 | 4/1964 | Walker et al. | 340/15.5 TN |
| 3,175,639 | 3/1965 | Liben | 340/15.5 AC |
| 3,356,177 | 12/1967 | Loren | 181/.5 R |
| 3,622,969 | 11/1971 | Lebreton et al. | 340/15.5 AC |

OTHER PUBLICATIONS

Chombart, "Well Logs in Carbonate Reservoirs", 8/60, pp. 779, 786, 792–810, 830–835, Geophysics, vol. 25, No. 4.

*Primary Examiner*—Nelson Moskowitz
*Attorney, Agent, or Firm*—Robert M. Betz

[57] ABSTRACT

A pulse of ultrasonic acoustic energy applied to an earth formation by means of a well logging tool initiates a first compressional formation pulse followed by a secondary pulse of lower amplitude and velocity traveling exclusively in the formation fluid. These two pulses are located, identified and quantized with cross-correlation techniques to give a direct indication of formation permeability, to identify accurately the nature of the formation fluid, and to provide a more accurate determination of formation porosity.

12 Claims, 7 Drawing Figures

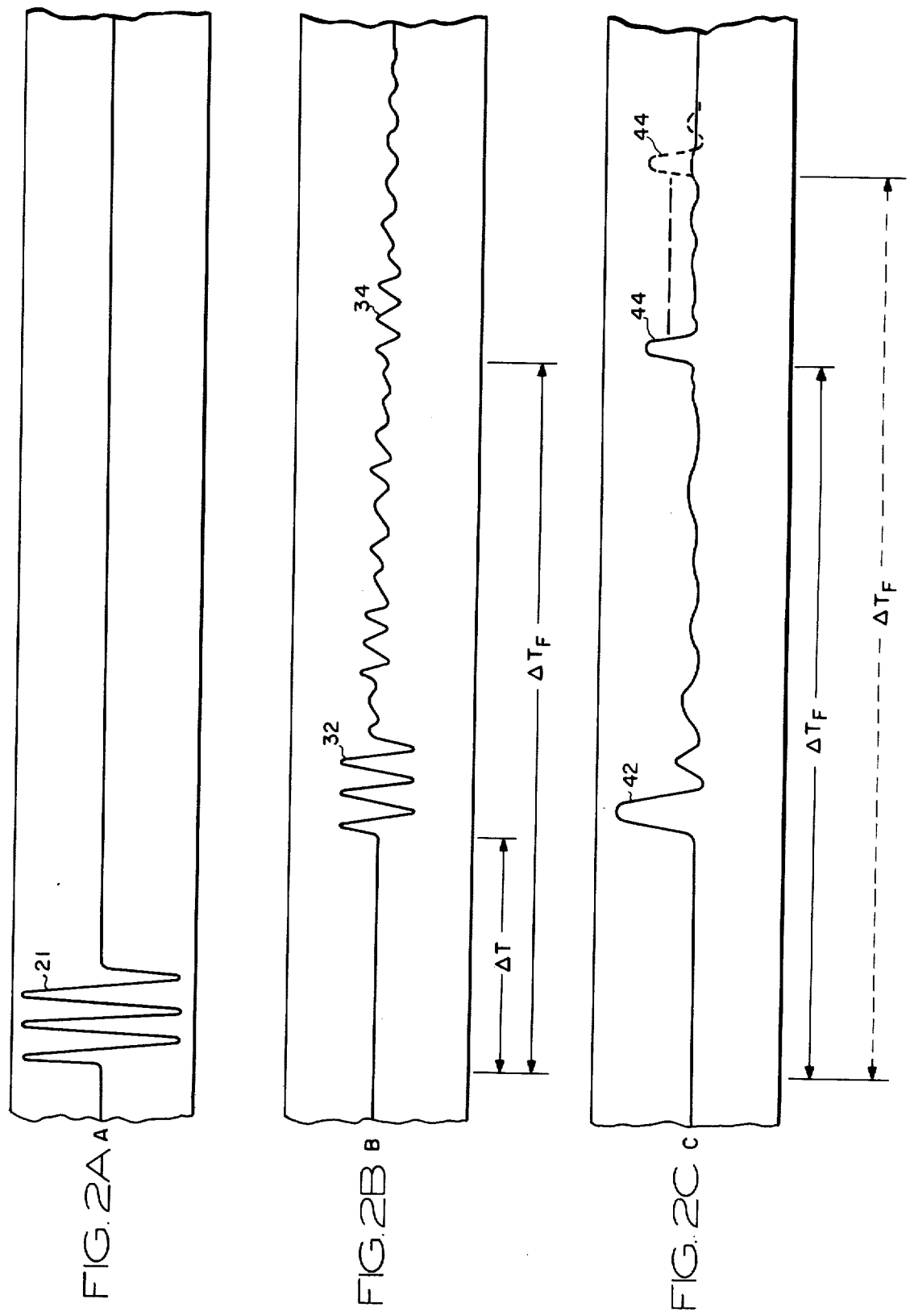

3,962,674

ACOUSTIC LOGGING USING ULTRASONIC FREQUENCIES

BACKGROUND OF THE INVENTION

1. Field of the Invention

This invention relates generally to the field of geophysical exploration. More particularly it is concerned with a method and apparatus for determining the permeability of an earth formation by analyzing the propagation of acoustic energy through the formation.

2. Description of the Prior Art

Permeability is a very important reservoir property which cannot be measured directly with presently available logging tools, but rather is measured in the laboratory from core samples or estimated from other well logging information. Conventionally, prior art sonic logs determine properties such as porosity and irreducible water saturation and then calculate permeability using empirical relations obtained from core data. However, the assumed empirical relation may not be applicable in many areas and often the formation properties actually measured cannot be determined with sufficient accuracy.

An acoustic signal transmitted from a logging tool must pass through varying amounts of drilling mud and varying thicknesses of mudcake in order to traverse a length of formation separating the transmitter and receiver of the tool. These factors, together with bore hole irregularities, cause deviations between the true and apparent values of transit time, velocity and degree of attenuation experienced by such an acoustic signal due to the formation itself. Consequently, prior art permeability calculations dependent upon these values are either distorted or require additional steps to correct for such errors.

SUMMARY OF THE INVENTION

It is, therefore a general object of this invention to provide a method and apparatus for determining permeability of a formation directly.

It is another more specific object of this invention to make such a direct determination of formation permeability by analyzing the propagation of sonic energy through the formation.

It is a still further object of this invention to directly measure formation permeability with an acoustic well logging tool without the necessity of corrections for bore hole and mudcake irregularities.

It is yet another object of this invention to provide a more accurate method of determining formation porosity.

It is a still further object of this invention to provide an improved method of identifying the character of the fluid in a formation.

These and other objects and advantages of this invention will become apparent from a consideration of the detailed description to follow taken in conjunction with the drawings appended thereto.

One embodiment of the method of this invention comprises the steps of applying acoustic energy to an earth formation at ultrasonic frequencies, identifying a primary formation pulse and a slower secondary fluid pulse propagated through the formation, and comparing the energy of these two pulses. The fraction of pulse energy transmitted entirely through the fluid is directly proportional to formation permeability. The transit time of the fluid pulse is inversely proportional to fluid velocity in the formation and hence to the character of the fluid.

The invention also comprises apparatus for carrying out the above method generally including a well logging tool provided with a transmitter and a receiver in spaced relation, each consisting of an electro-acoustic transducer of frequency response in excess of 100 kHz. A pulse generator drives the transmitter so that ultrasonic energy is transmitted at intervals through the formation to the receiver. Means are provided for amplifying the received pulse spectrum and cross-correlating it with the transmitted pulse. The resultant correlation pulses locate and identify the initial formation pulse and the secondary fluid pulse. An analog voltage representative of the amplitude ratio between these two correlation pulses actuates a recorder to provide a continuous trace proportional to permeability. Another analog voltage drives the same recorder to generate a trace representative of fluid pulse transit time.

In an alternate embodiment, the apparatus of this invention includes a dual receiver well logging probe enabling a precise determination of true formation transit time for both the initial pulse and the fluid pulse with the aid of cross-correlation. Formation porosity is then computed from a standard formula combining transit times for initial pulse and fluid pulse and pulse transit time for the particular formation matrix concerned.

DESCRIPTION OF THE DRAWINGS

FIGS. 2a, 2b and 2c depict respectively acoustic pulses transmitted into a formation and received by the logging tool and a cross-correlation trace in accordance with this invention.

DESCRIPTION OF THE PREFERRED EMBODIMENTS

When an acoustic pulse is transmitted from a logging tool through a formation, it follows a number of paths of differing nature in order to get to the receiver. Some of these paths are through solid particles of sand or rock; others are partially through solids and partially through interstitial fluid; and finally some are through interconnected fluid-filled pore spaces or channels alone. The degree to which the so-called "fluid pulse" propagating exclusively through such interconnected fluid paths, is attenuated in comparison to the most direct formation pulse constitutes a measure of the permeability of formation. The method and apparatus to be described undertakes, therefore, to identify and quantify the primary formation pulse and secondary fluid pulse in the total frequency spectrum passing through a formation.

The velocity of an acoustic pulse transmitted through a number of specific fluids has been accurately measured. As described in what follows, the transit time of the fluid pulse in a particular formation over a given distance, which is the inverse of its velocity, is compared with the known data so as to identify the presence of a particular fluid such as oil in the formation fluid.

Sonic energy of relatively low frequencies is unable to propagate through very narrow paths. Therefore, such energy may not produce any identifiable fluid pulse if permeability is low. Therefore, preferably in the method of this invention, very high frequency acoustic energy on the order of 1-100 kHz is injected into a formation of interest in order to amplify the characteristic fluid pulse sufficiently for its detection.

Figure 1:
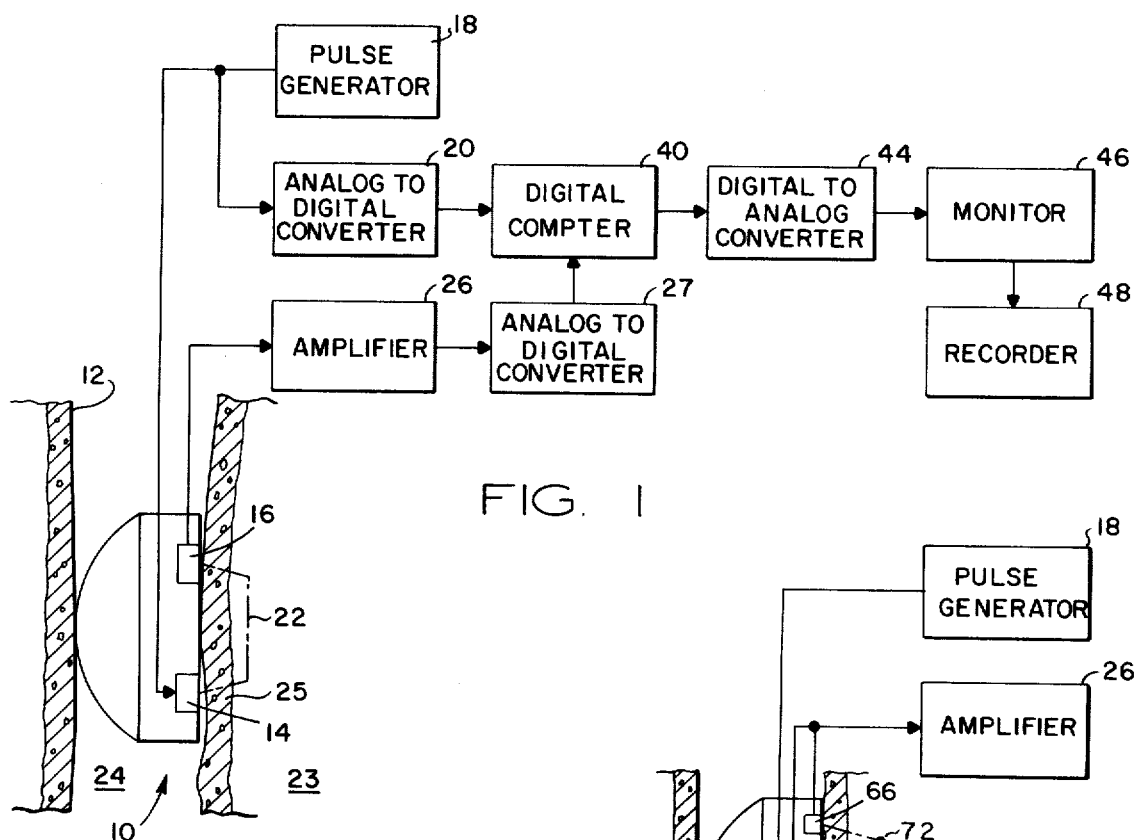
FIG. 1 is a block diagram of the apparatus of the invention utilized in conjunction with an acoustic well logging tool.

With reference now to FIG. 1, an acoustic well logging tool or probe 10, located within a wellbore 12 is provided with an electro-acoustic transmitter 14 and an electro-acoustic receiver 16, each having a frequency response in the ultrasonic range, and respectively positioned adjacent opposite ends of the tool 10. Pulses of electrical energy are provided at suitable intervals by means of a pulse generator 18, one portion of each such energy pulse being applied to the transmitter 14 and a second portion being transmitted to an analog-to-digital converter 20. The electrical pulse is converted by the transmitter 14 into an acoustic pulse 21 of ultrasonic frequency, preferably from one kHz to one MHz, which traverses ray segment 22 through the earth formation 23 adjacent the bore hole 12 and is sensed by the receiver 16. The complete path includes passage in both directions through mud 24 and mudcake 25. The received ultrasonic pulse spectrum is reconverted to an electrical signal which is applied to amplifier 26 and then digitized by means of analog-to-digital converter 27.

The propagation of the transmitted pulse 21 through the formation 22 may be better understood with reference to FIGS. 2a, 2b and 2c. FIG. 2a illustrates the pulse 21 represented, for example, as several cycles of a uniform sinusoid. Within the scope of this invention, the transmitted pulse 21 may however consist of any desired complex wave form. When pulse 21 enters the formation 23, it produces a primary formation pulse 32 (FIG. 2b) reduced in amplitude which is sensed by receiver 16 after a transit time $\Delta T$. The primary pulse 32 is followed by a fluid pulse 34 which travels exclusively through interconnected fluid paths in the formation 23. Pulse 34 will be further attenuated since only a fraction of the total available energy follows this pure fluid path. Although identified for illustrative purposes on the trace of FIG. 2b, the presence of the fluid pulse 34 is (in actuality masked in the total pulse spectrum sensed by receiver 16 because of the presence of noise.

Because of the lower velocity of fluid 34, the signal arrives at receiver 16 later than the initial pulse 32 and after a transit time $\Delta T_F$ measured from the beginning of the transmitted pulse 30. However, without the aid of additional techniques the pulse 34 cannot be located and consequently no measure of its attenuation or transit time is possible.

Figures 3A, 3B:
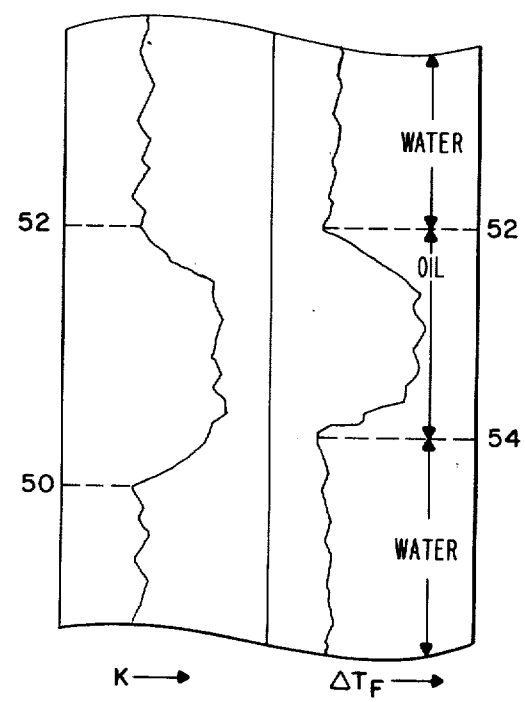
FIGS. 3a and 3b represent respectively traces of formation permeability and fluid pulse transit time in accordance with this invention.

The digitized output of the pulse generator 18 is now cross-correlated with the spectrum from receiver 16 with the aid of a digital computer 40. FIG. 2c depicts a trace of such a cross-correlation. A first correlation signal 42 will occur to mark coincidence of the transmitted pulse 30 and the primary formation pulse 32. A second correlation pulse 44 of reduced amplitude marks the coincidence of the transmitted pulse 30 and the fluid pulse 34. The peak amplitudes of the correlation pulses 42 and 44 are respectively proportional to the energy of the initial pulse 32 and the fluid pulse 34. The relative amount of acoustical energy transmitted entirely through the formation fluid depends in turn upon the average cross-sectional area of the available fluid channels, or in other words, upon formation permeability. Thus, the ratio of the amplitude of the correlation pulses 42 and 44 is directly proportional to formation permeability. The apparent transit time $\Delta T$ and $\Delta T_F$ differ slightly from the true formation transit times because the acoustic signal 30 passes through mud 24 and mudcake 25. But the relative amplitudes of pulses 32 and 34 are unaffected by this difference. Hence, no corrections are necessary. This amplitude ratio may now be translated into an analog voltage by means of digital-to-analog converter 44 and employed to actuate a monitor 46 such as a meter calibrated to read formation permeability directly in darcies. This information may be simultaneously fed to a recorder 48 to yield a permeability trace as depicted in FIG. 3a. For example, if, as the tool 10 is moved along the well bore 12 in an upward direction, it reaches a formation of increased permeability, the amplitude of the trace of FIG. 3a will exhibit an increase at level 50. At the top of the formation at level 52, the trace will again decrease in amplitude, coinciding with a return to a condition of decreased permeability.

The transit time of an acoustic wave over a fixed distance is inversely proportional to the velocity with which the wave propagates. Thus, the transit time $\Delta T_F$ of the fluid pulse 34 between the transmitter 14 and the receiver 16 can also be used within the scope of this invention to identify the nature of the formation fluid. It is known that the acoustic velocity of a compressional wave in pure water is about 4800 feet per second at normal temperature and pressure. See in this connection Guyod, GEOPHYSICAL WELL LOGGING, copyright 1969, Table 7-I, p. 106. The corresponding compressional velocity in petroleum is in the vicinity of 4200 feet per second or about 10 percent less than in water, depending upon the viscosity of the oil in a particular formation. With reference for illustrative purposes to the correlation trace of FIG. 2c, $\Delta T_F$ for fluid correlation pulse 44 may initially indicate the presence of water. At a later time, the pulse 44 may be shifted to the right (shown in dotted outline) corresponding to a transit time $\Delta T_F$ of greater duration, indicating the presence of oil.

The trace of FIG. 3b depicts varying analog voltages representative of $\Delta T_F$ as the logging tool 10 is moved upwardly. Assuming the presence of water below the formation 22, there will initially be no change in $\Delta T_F$ at level 50 as the lower formation interface is traversed, since the fluid pulse continues to propagate entirely through water which lies beneath any oil in the formation 22. As the tool 10 continues upwardly to the level 54, the value of $\Delta T_F$ increases gradually to a maximum, indicating increasing oil content in the formation fluid. Finally, at the upper level 52, $\Delta T_F$ decreases rather abruptly indicating the arrival of the interface between oil and water at the top of the formation 23. Deviation between the measured value of $\Delta T_F$ and true formation fluid pulse transit time will not affect the shape of the trace in FIG. 3b nor the location of the beginning and the end of the anomaly indicating the presence of oil.

Figure 4:
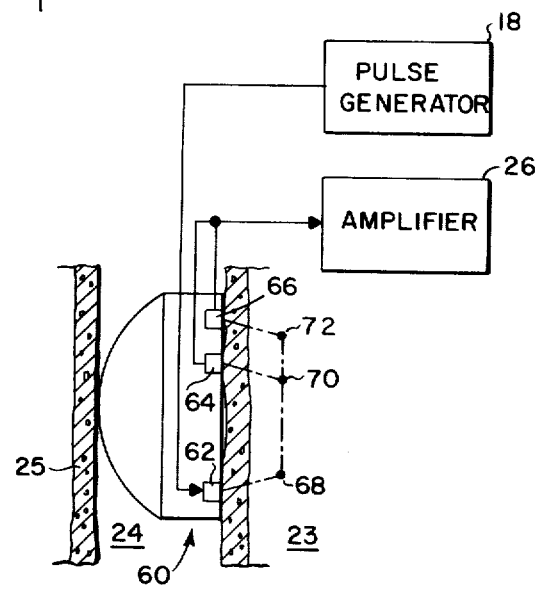
FIG. 4 is a partial block diagram of the apparatus of this invention utilized in conjunction with a dual receiver acoustic well logging tool.

A more accurate measurement of formation porosity may be made with the aid of this invention by incorporating a dual-receiver well logging tool 60 in place of the tool 10 in FIG. 1. With reference to FIG. 4, such a tool 60 may include at one end thereof an electro-acoustical transmitter 62 and a pair of spaced-apart electroacoustical receivers 64 and 66 adjacent the opposite end of tool 60 and at different distances from transmitter 62. The surface circuitry with which the tool 60 is interconnected is in all essential respects the same as that described in connection with FIG. 1.

Electrical energy applied to transmitter 62 generates the acoustic signal 21 and again produces the primary formation pulse 32 and secondary fluid pulse 34. Both pulses 32 and 34 traverse the formation ray 68—70 to reach receiver 64 and the longer formation ray 68—72 to reach receiver 66. The true transit times $\Delta T$ and $\Delta T_F$ of these two pulses in the formation 23 along the ray 70—72 between receivers 64 and 66 are obtained by determining the difference in arrival times of pulses 32 and 34 at receivers 64 and 66 respectively. The correlation technique described above may, therefore, be applied to the frequency spectra obtained from the dual receivers 64 and 66 to obtain an accurate transit time for the fluid pulse 34 as well as for the primary formation pulse 32, undistorted by mudcake or bore hole irregularities. The digital computer 40 may easily be programmed to perform the required arithmetic steps.

In terms of transit time, a standard formula for formation porosity may be now expressed as follows:

$$\phi = \frac{\Delta T - \Delta T_M}{\Delta T_F - \Delta T_M} \times 100$$

where $\Delta T_M$ is the theoretical transit time of an acoustic pulse through a known interval of the rock matrix in question, $\Delta T$ is the true transit time of the primary formation pulse 32, and $\Delta T_F$ is the true transit time of the fluid pulse 34. Conventional calculation of formation porosity from measured compressional velocity, which is inversely proportional to transit time, depends necessarily upon an arbitrary value for fluid velocity, such as 5000 feet per second. The advantage of the Applicant's method over this prior art method lies in the fact that this quantity is determined by measurement from point to point along the formation, and consequently considerable increase in the accuracy of the calculated value of porosity may be expected.

As noted earlier, although it is easier to generate a transmitted pulse 21 in the form of a uniform sinusoid as illustrated in FIG. 2a, the pulse 21 may have any desired complex shape. If the received wave form spectrum is totally immersed in noise, detection of pulses 32 and 34 by the above-described cross-correlation technique is enhanced, providing a transmitted pulse 21 having a large number of cycles of complicated arbitrary form.

While this invention has been described in conjunction with a presently preferred embodiment or embodiments, it will be appreciated that those skilled in this art will have no difficulty in modifying many of the particular structural details, circuits, elements, and other specific features as described above without departing from the scope and spirit of the invention as set forth in the appended claims.

The embodiments of the invention in which an exclusive property or privilege is claimed are defined as follows:

1. An acoustic logging system for determining characteristics of an earth formation comprising:
    a. downhole logging means for transmitting an acoustic signal at ultrasonic frequency through the adjacent formation and for receiving said signal,
    b. means for detecting the initial compressional pulse and the subsequent fluid pulse in said received signal, and
    c. means for analyzing said initial compressional pulse and subsequent fluid pulse to determine formation characteristics dependent upon their relative attenuation and transit times.

2. A system as in claim 1 wherein said transmitted signal has a frequency component of at least one kHz.

3. An acoustic logging system for determining formation permeability comprising:
    a. downhole logging means for transmitting an acoustic signal at ultrasonic frequency through the adjacent formation and for receiving said signal,
    b. means for detecting the initial formation compressional pulse and the subsequent fluid pulse in said received signal, and
    c. means for comparing the relative attenuation of said initial compressional pulse and said subsequent fluid pulse with respect to said transmitted acoustic signal.

4. A system as in claim 3 wherein said detecting means comprises means for cross-correlating said transmitted signal with said received signal to obtain two correlation pulses respectively proportional in amplitude to the attenuation of said initial compressional pulse and said fluid pulse.

5. A system as in claim 4 wherein said means for cross-correlation additionally comprises means for digitizing said transmitted and received signals and digital computer means responsive to said digitized signals for performing said cross-correlation.

6. A system as in claim 5 additionally comprising means for recording sequential values of said relative attenuation, said values being representative of formation permeability.

7. An acoustic logging system for identifying the nature of the fluid in a formation comprising:
    a. downhole logging means for transmitting an acoustic signal at ultrasonic frequencies through the adjacent formation and for receiving said signal,
    b. means for detecting the pure fluid pulse in said received signal,
    c. means for measuring the apparent transit time of said pure fluid pulse through said formation,
    d. means responsive to said measuring means for recording sequential values of said transit time, and
    e. means for converting said sequential recorded values into the corresponding values of fluid velocity for comparison with the known acoustic velocities of specific fluids.

8. In an acoustic logging system, a method of determining the permeability of an earth formation comprising the steps of:
    a. transmitting a downhole acoustic signal across a known interval in said formation,
    b. receiving said acoustic signal after propagation across said interval,
    c. detecting the initial compressional pulse and the subsequent fluid pulse in said received signal, and
    d. comparing the relative attenuation of said initial compressional pulse and said subsequent fluid pulse with respect to said transmitted acoustic signal.

9. The method of claim 8 wherein said step of detecting said initial compressional pulse and said subsequent fluid pulse comprises cross-correlating said transmitted signal with said received signal to obtain two correlation pulses respectively proportional to the amplitudes of said initial compressional pulse and said fluid pulse.

10. In an acoustic logging system, the method of identifying the nature of the fluid in an earth formation comprising the steps of:
   a. transmitting a downhole acoustic signal at ultrasonic frequencies into a formation,
   b. receiving such signal after propagation through a known interval in said formation,
   c. detecting the pure fluid pulse in said received signal,
   d. measuring the transit time of said pure fluid pulse across said interval in said formation,
   e. converting said transit time into a corresponding value of acoustic fluid velocity, and
   f. comparing said calculated value of fluid velocity with the known acoustic velocity of specific fluids.

11. In a method for calculating the average porosity of an earth formation over a known interval as a function of the respective transit times of an acoustic signal across the matrix, formation and fluid phases of said interval in accordance with the formula:

$$\phi = \frac{\Delta T - \Delta T_M}{\Delta T_F - \Delta T_M} \times 100$$

where $\phi$ = porosity expressed as a volume percentage,
$\Delta T$ = formation transit time,
$\Delta T_M$ = matrix transit time, and
$\Delta T_F$ = fluid pulse transit time,
the improvement comprising identifying said fluid pulse in the frequency spectrum of said acoustic signal, measuring the true transit time of said fluid pulse across said interval in said formation, and substituting said value of fluid pulse transit time in said formula.

12. The method of claim 11 wherein said step of measuring the true transit time of said fluid pulse comprises cross-correlating said acoustic signal as transmitted to said formation with the frequency spectrum of said acoustic signal as received from said formation in order to detect the fluid pulse in said frequency spectrum of said received acoustic signal.

* * * * *